Figure 1:
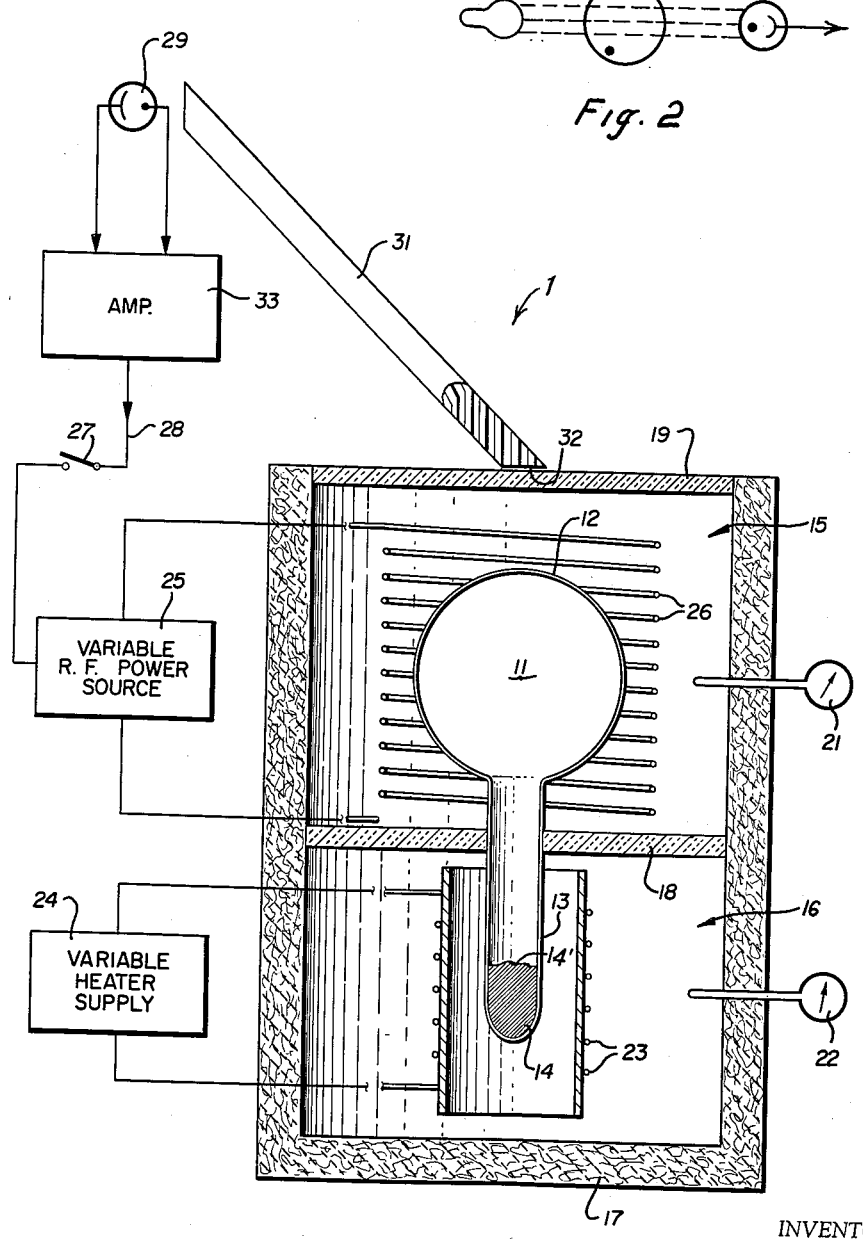

March 14, 1961 A. L. BLOOM ET AL 2,975,330
ELECTRODELESS DISCHARGE METHOD AND APPARATUS
Original Filed March 3, 1959

INVENTOR.
William E. Bell
Arnold L. Bloom
BY
Paul D. Hunter
Attorney

United States Patent Office 2,975,330
Patented Mar. 14, 1961

2,975,330

ELECTRODELESS DISCHARGE METHOD AND APPARATUS

Arnold L. Bloom, Los Altos, and William E. Bell, Palo Alto, Calif., assignors to Varian Associates, Palo Alto, Calif., a corporation of California Continuation of application Ser. No. 796,936, Mar. 3, 1959. This application June 1, 1960, Ser. No. 33,339

26 Claims. (Cl. 315—115)

This invention relates to electrodeless discharge lamps and more particularly to electrodeless discharge lamps having a controlled spectral intensity distribution.

Applications in the field of optical spectroscopy, such as those relating to the investigation and utilization of detailed atomic and nuclear structure, require optical radiation sources which have both highly resolved spectral lines and high spectral intensity. Presently available lamps, generally being designed only to maximize the total optical intensity, operate under such temperature, pressure and excitation conditions that the spectral lines are considerably broadened thus rendering such lamps undesirable in spectroscopic application.

Further, in such applications as those wherein optically responsive signals are used to indicate the presence and/or physical condition of an optical absorber, it is necessary to have an optical radiation source yielding a constant output intensity over long periods of times. In the example given, any fluctuations in source intensity are reflected as noise in the optical detection circuit, thus masking out the desired signals due to changes in the amount and/or condition of the optically absorbing material under observation. In this respect presently available lamps, especially those utilizing electrodes to maintain a discharge in a metallic vapor, are undesirably characterized by both long-time and short-time intensity fluctuations. As examples of long-time intensity fluctuations it is to be noted that (1) such discharges are inherently unstable so that incremental intensity fluctuations tend to accumulate thus causing the intensity to become progressively stronger or weaker, (2) condensation of the vapor on the walls of the lamp causes a gradual "blackening" and attendent loss of intensity and (3) the electrodes are subject to gradual deterioration thus affecting the quality of the discharge. As examples of short-time intensity fluctuations, (1) the electrodes and molten metal present in the discharge area tend to suputter thereby producing rapid changes in the electric discharge fields which are reflected in bursts of intensity variations and (2) the discharge tends to rapidly move about the electrode surface thereby producing variations in the quality and intensity of the discharge.

Additional disadvantages of presently available lamps become apparent in view of the fact that practical instrumentation of optical systems requires units which are capable of long periods of uniform quality operation, use a minimum of power, and occupy a minimum of space. Thus, it is to be further noted that presently available lamps vary considerably in spectral quality from lamp to lamp; have severely limited effective lives due to such effects as electrode deterioration, wall blackening and "clean-up" of the gaseous discharge material by absorption in the electrodes; require large amounts of power; and require large amounts of space, especially when it is necessary to employ cumbersome control apparatus, such as pumps, in order to obtain satisfactory operation.

It is therefore the object of this invention to overcome these and other limitations of the prior art by providing a lamp having a controllable spectral intensity distribution, which is capable of reliable, constant quality operation over long periods of operation, which consumes small amounts of power, and which occupies a minimum of space.

One feature of the present invention is the provision of an electrodeless discharge lamp operated so that the temperature of the discharge region is maintained at a value which concentrates the intensity of the lamp within a very narrow frequency band.

Another feature of the present invention is the provision of a lamp in accordance with the preceding paragraph further including a reservoir region containing a substance providing an optically excitable vapor, and operated so that the temperature of said reservoir region is maintained at a temperature which is less than the temperature of said discharge region.

Still another feature of the present invention is the provision of electrodeless lamp apparatus having means for controlling the intensity of optical radiation propagated in given direction.

Figure 2:
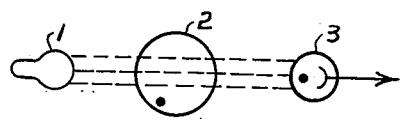

These and other features and advantages of the present invention will become apparent from a perusal of the following specification taken in connection with the accompanying drawing wherein, Figure 1 is a cross-sectional view of a preferred embodiment of the lamp apparatus of the present invention which is particularly useful as an optical radiation source for the optical monitoring of aligned quantum systems, Fig. 2 is a schematic diagram illustrating the arrangement of certain elements in an optical monitoring system.

The technique of optical monitoring is disclosed, for example, in the following co-pending U.S. patent applications of Hans George Dehmelt: Serial No. 640,020, entitled "Optical Absorption Monitoring of Oriented or Aligned Quantum Systems," filed February 13, 1957; Serial No. 649,190, entitled "Optical Absorption Monitoring of Aligned Alkali Atoms," filed March 28, 1957; Serial No. 649,191, entitled "Gyromagnetic Resonance of Optically Aligned Alkali Atoms," filed March 25, 1957. Reference is made to these co-pending applications for a more complete discussion of the technique. Briefly, it may be stated that certain lines in the optical spectrum are found to be more strongly absorbed by atoms or other quantum systems which are in a preferred set of energy sublevels than by those in the other energy sublevels. It is thereby possible, for example, to align an assemblage of atoms (by causing the non-absorbing energy sublevels to become over-populated with respect to the absorbing energy sublevels) and then to detect or monitor any change in alignment by corresponding changes in the intensity of optical radiation which is transmitted through the atomic system without absorption.

In accordance with the present invention, the sensitivity of such optical monitoring techniques is greatly enhanced by using a controlled source of optical radiation. For example, in the case of the so-called "D" lines of the alkali metal spectrum (corresponding to the lowest frequency doublet of the principal series), it was found that the useable portion of the line comprises only a very narrow center band of about 1.7 kmc., whereas the line width of present available lamps, designed to yield maximum total intensity, is on the order of 100 kmc. Accordingly, it is necessary to provide lamp apparatus which may be controllably regulated to maximize the intensity within this useable band with a minimum of intensity fluctuation or noise. Generally, this may be accomplished by determining either experimentally or by calculation an optimum combination of discharge parameters, such as the discharge power input, discharge region temperature and internal gas or vapor pressure, and then closely controlling such parameters.

Referring more particularly to Fig. 1, a sealed discharge tube 11 comprises a generally spherical discharge portion 12 and an outwardly extending cylindrical reservoir portion 13, the length of portion 13 being on the order of two and one-half times the diameter of portion 12. A small amount of an alkali metal 14 which may be heated to evolve an optically excitable vapor from surface 14' is placed in reservoir 13. Portions 12 and 13 are housed in thermally independent regions 15 and 16 defined by a cylindrical insulating wall 17 as of, for example, glass wool, and a washer-shaped partition 18 as of, for example, lava. Partition 18 additionally serves to securely support tube 11. The temperatures of regions 15 and 16 are monitored respectively by indicators 21 and 22, such as thermometers or thermistors. The temperature of region 16 is controlled by heating element 23 as of, for example, nichrome wire coupled to heater supply 24 which is made variable as by the provision therein of a variable transformer.

An electrodeless optical discharge is excited in tube portion 12 by energizing coil 26 surrounding tube portion 12 with radio frequency power from source 25 which is preferably a constant current oscillator the output power level of which is made variable as by controlling the screen voltage or other suitable parameter on the output tube or tubes. The optical radiation produced by the discharge is directed through glass window 19.

The use of the described lamp in an optical monitoring system is illustrated in Fig. 2. Lamp 1 produces a beam of highly resolved, constant intensity optical radiation which is directed through absorption cell 2 and selectively absorbed by the atomic or other quantum mechanical absorbing system contained therein. For example, cell 2 may contain an alkali vapor in an aligning magnetic field. High signal to noise indications of changes in the alignment of the quantum system are obtained by the corresponding changes in the intensity of the optical radiation passing through cell 2 without absorption and intercepting intensity detector 3.

It is to be noted that the particular excitation frequency from source 25 is not critical but may extend from about 1 mc. upwards to frequencies in the microwave region. Satisfactory results with alkali vapors have been obtained at frequencies in the range of about 30-100 mc. with a discharge sphere diameter of one inch, somewhat lower frequencies being used for larger spheres.

In the illustrated embodiment, the circuit comprising power source 25 and R.F. coil 26 performs the dual functions of initiating and controlling the discharge in tube portion 12 and of controlling the temperature in region 15 by the energy dissipation in discharge portion 12 and the rest of region 15. Ideal spectral intensity distribution for the purpose of optical monitoring is found to exist when regions 15 and 16 are maintained at about 130° centigrade and 100° centigrade, respectively, for rubidium and 250° centigrade and 200° centigrade, respectively, for sodium. Under these conditions an optimum alkali vapor pressure of about 1 micron (determined primarily by the temperature in the reservoir region 16) is statically maintained in the discharge tube and the required power input to the discharge is only on the order of a few watts. The slightly higher temperature in the region 15 serves to prohibit the condensation of metal vapor on the walls of the tube portion 12 thus maintaining the optical transmission efficiency of the discharge constant for long periods of service. Further, it is to be noted that the above temperature control, establishing a thermal gradient between regions 15 and 16 sufficient to prevent discharge-disturbing migration of metal particles from tube portion 13 to tube portion 12, combines with the provision of a metal reservoir portion remote from the discharge area to additionally aid in eliminating short-time bursts of noise. A starting medium, such as a few mm. pressure of argon or other noble gas may be optionally added to the tube 11 to aid in the quick initiation of a discharge without substantially interfering with optimum operation.

Temperature variations which may lead to deterioration of the spectral quality of the discharge are continuously monitored by indicators 21 and 22. These variations, which are principally relatively long-time variations, may be satisfactorily compensated by manual variation of temperature controls 24 and 25. It will be apparent to those skilled in the art that this control may be effected automatically by obtaining electrical temperature indications, as where indicators 21 and 22 are thermistor devices, and feeding these electrical signals back into heat control units 25 and 24 respectively. Where this latter technique is used, it is possible to compensate for somewhat shorter time fluctuations than would be possible by manual control.

Although quite satisfactory results have been obtained using the above described temperature controls alone, there are certain shorter time fluctuations in spectral quality, such as those due to power supply ripple, for example, which are not reflected with sufficient sensitivity by temperature indicators. Thus operation may be further enhanced by including circuit 28 (as by closing switch 27) and monitoring intensity fluctuations with an optical detector such as photocell 29. Such short time variations are found to vary considerably with the direction in which the optical radiation is emitted, so that fluctuation monitoring is preferably effected with respect only to optical radiation propagated in the direction of greatest utility. In the illustrated embodiment, the optical radiation of greatest importance is emitted normal to the transparent surface 19 and it is therefore desirable to monitor only the radiation propagating in this direction. Such monitoring is effected by the provision of a Lucite rod 31 which samples the useful radiation portion at surface 32 and transmits the radiation along the axis of the rod to photocell 29. Other schemes for performing this function will be readily apparent to those skilled in the art as, for example, by suitable placement of mirrors. Photocell 29 produces electrical signals in response to the monitored radiation intensity which is amplified by amplifier 33 and then transmitted for control purposes to power source 25, as by controlling the screen supply voltage of an output oscillator tube therein. Such monitoring serves not only to control short-time fluctuations but additionally aids in the stabilization of long-time instabilities which are also reflected in the radiation intensity.

In some applications there may be no substantial advantage in dividing the discharge tube into separate regions as where the optically excited substance is normally in a gaseous state or where the material from which an optically excitable vapor evolves will not materially interfere with the quality of the discharge. In such a case adequate control of the discharge will be effected by source 25 alone or in combination with an auxiliary heater as explained below. The provision of separate discharge and reservoir regions temperature controls is, however, particularly desirable where the excitable vapor is evolved from a metallic substance. Among such substances which are found useful in the art of optical monitoring of quantum systems, for example, are the alkali metals, mercury and thallium. Even where separate control regions are used it is not necessary in all cases to have two separate power supplies. For example, the temperature of region 16 may be established by a suitable heat leak control through partition 18 and the lower part of wall 17. Also, it may not always be possible for the radio frequency coil 25 to perform adequately a heat controlling function as well as a discharge producing function, in which case an auxiliary heater may be used.

Although the radio frequency discharge excitation means has been described as including a coil, it is evident that other radio frequency electromagnetic means can be used. For example, in the high frequency range it may be necessary to place the discharge lamp within a microwave cavity resonator and in applications where it is desired to have an intense electrical field the lamp may be placed between the plates of a capacitor which are energized at the proper frequency.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

This application is a continuation of application Serial No. 796,936, filed March 3, 1959, and now abandoned.

What is claimed is:

1. Electrodeless discharge lamp apparatus comprising an electrodeless discharge region, electromagnetic means adjacent said discharge region for exciting a substantially noise-free discharge therein, and means for maintaining the temperature of said discharge region at a value which concentrates the intensity of the lamp within a very narrow frequency band thereby enabling constant spectral quality lamp operation over long periods of time.

2. Apparatus according to claim 1 wherein said discharge region contains sodium vapor and wherein the temperature of said region is maintained at about 250° C.

3. Apparatus according to claim 1 wherein said discharge region contains rubidium vapor and wherein the temperature of said region is maintained at about 130° C.

4. Electrodeless discharge lamp apparatus comprising an electrodeless discharge region containing an optically excitable vapor therein, electromagnetic means adjacent said discharge region for exciting a substantially noise-free discharge in said discharge region, means for establishing the temperature of said discharge region at a value which concentrates the intensity of the lamp within a very narrow frequency band, a reservoir region communicating with said discharge region and having the vapor producing surface of a vaporizable substance contained therein, and means for establishing the temperature of said reservoir region independently of the temperature of said discharge region.

5. Apparatus according to claim 4 wherein said means for establishing a temperature in said reservoir region serves to statically establish the vapor pressure in said discharge region.

6. Apparatus according to claim 4 wherein said substance is a metallic substance.

7. Apparatus according to claim 4 wherein said reservoir region temperature is established at a lower value than said discharge region temperature thereby preventing condensation of the metallic vapor in the said discharge region.

8. Apparatus according to claim 7 wherein said metal is an alkali metal.

9. Apparatus according to claim 6 wherein said metal is sodium, said reservoir region temperature is established at approximately 200° C., and said discharge region temperature is established at approximately 250° C.

10. Apparatus according to claim 6 wherein said alkali metal is rubidium, said reservoir region temperature is established at approximately 100° C., and said discharge region temperature is established at approximately 130° C.

11. Electrodeless discharge lamp apparatus comprising an electrodeless discharge region, radio frequency means adjacent said discharge region for exciting a substantially noise-free discharge therein, means for indicating the temperature of said discharge region and means controllable in response to said temperature indication for maintaining the temperature of said discharge region at a value which concentrates the intensity of the lamp within a very narrow frequency band.

12. Apparatus according to claim 11 wherein said means for controllably maintaining said discharge region temperature comprises means for adjusting the output of said radio frequency excitation means.

13. Apparatus according to claim 11 further including a reservoir region communicating with said discharge region and supplying an optically excitable vapor thereto, means for indicating the temperature of said reservoir region and means controllable in response to said temperature indication for maintaining the reservoir region temperature independently of the temperature of said discharge region.

14. Electrodeless discharge lamp apparatus comprising an electrodeless discharge region, radio frequency means adjacent said discharge region for exciting a discharge therein, means for indicating the intensity of optical radiation propagated from said discharge, and means responsive to said indicated intensity for controlling the power level of said radio frequency means thereby stabilizing said optical radiation.

15. Apparatus according to claim 12 further including means for directing optical radiation which is emitted in a given direction to said optical radiation intensity indicating means.

16. Apparatus according to claim 4 wherein a thermal gradient is established within the lamp sufficient to prevent migration of particles of said substance from said reservoir region into said discharge region.

17. Apparatus according to claim 4 wherein said discharge exciting means includes a constant current oscillator having a frequency in excess of 1 mc.

18. In a low noise, high sensitivity system for the optical monitoring of aligned quantum systems the combination comprising: an optical absorption cell containing an optically absorbing quantum system; an electrodeless discharge lamp having two thermally independent regions, said first region having the vapor producing surface of an alkali metal deposit contained therein and supplying an optically excitable alkali vapor to said second region; electromagnetic means adjacent said second lamp region for exciting a substantially noise-free discharge therein; means for establishing the temperature in said second lamp region at a value which concentrates the optical radiation from said lamp into a narrow absorption band associated with said quantum system; means for establishing the temperature of said first lamp region independently of the temperature of said second lamp region; and means for detecting the intensity of the optical radiation passing through said cell without absorption as an indication of the alignment of said quantum system.

19. The combination of claim 18 wherein said alkali metal is sodium, the temperature of said first region is established at about 200° C. and the temperature of said second region is established at about 250° C.

20. The combination of claim 19 wherein said alkali metal is rubidium, the temperature of said first region is established at about 100° C. and the temperature of said second region is established at about 130° C.

21. The combination of claim 19 wherein said discharge exciting means includes a constant current oscillator having a frequency in excess of 1 mc.

22. The method of generating high spectral quality optical radiation which comprises the steps of establishing a substantially noise-free electrodeless discharge in the discharge region of a lamp, and maintaining the temperature of said discharge region at a value which concentrates the intensity of the lamp within a very narrow frequency band.

23. The method of claim 22 wherein said discharge is produced by a constant current oscillator having a frequency in excess of 1 mc.

24. The method of claim 23 wherein said discharge region contains sodium vapor and the temperature of said region is maintained at about 250° C.

25. The method of claim 23 wherein said discharge region contains rubidium vapor and the temperature of said region is maintained at about 130° C.

26. The method of claim 22 wherein said lamp includes a reservoir region containing a substance providing an optically excitable vapor for said discharge, and further including the step of maintaining the temperature of said reservoir region at a temperature, less than the temperature of said discharge region, which establishes a desired vapor pressure.

References Cited in the file of this patent

UNITED STATES PATENTS

| | | |
|---|---|---|
| 1,813,580 | Morrison | July 7, 1931 |
| 1,844,353 | Foulke | Feb. 9, 1932 |
| 2,118,452 | LeBel | May 24, 1938 |
| 2,805,365 | Mulder | Sept. 3, 1957 |

UNITED STATES PATENT OFFICE

CERTIFICATE OF CORRECTION

Patent No. 2,975,330                      March 14, 1961

Arnold L. Bloom et al.

It is hereby certified that error appears in the above numbered patent requiring correction and that the said Letters Patent should read as corrected below.

Column 6, line 23, for the claim reference numeral "12" read -- 14 --.

Signed and sealed this 27th day of February 1962.

(SEAL)
Attest:

ERNEST W. SWIDER                      DAVID L. LADD
Attesting Officer                      Commissioner of Patents